Jan. 27, 1970  M. H. G. G. CAIGNET  3,491,745
HEATING APPARATUS WITH LIQUID FUEL BURNER
AND RADIATING ASSEMBLY
Filed Jan. 2, 1968  3 Sheets-Sheet 1

INVENTOR.
Michel H.G.G. Caignet
BY
Hall, Pollock & Vande Sande

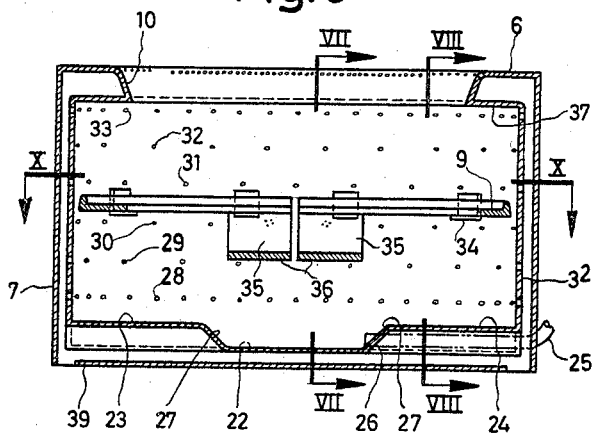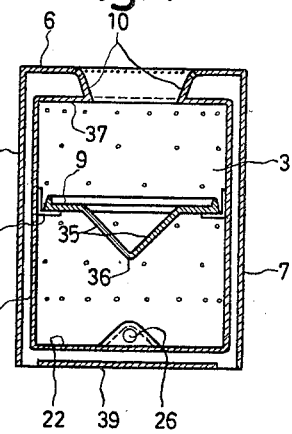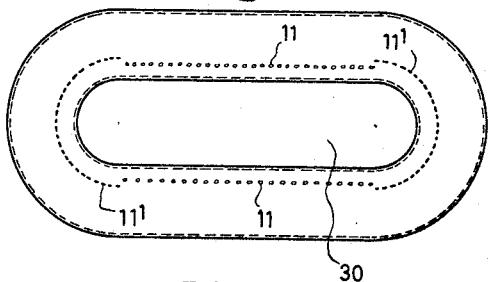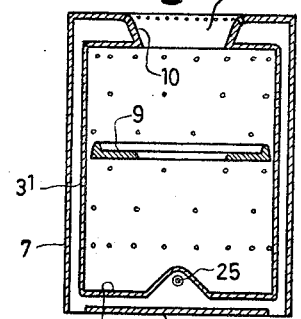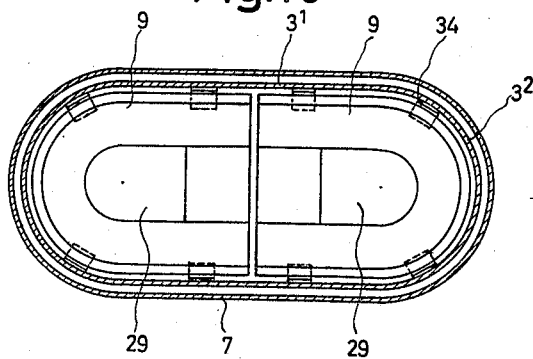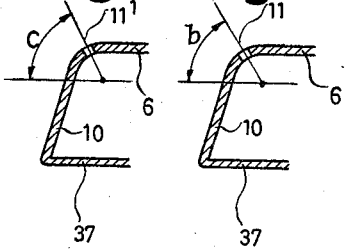

United States Patent Office 3,491,745
Patented Jan. 27, 1970

3,491,745
HEATING APPARATUS WITH LIQUID FUEL
BURNER AND RADIATING ASSEMBLY
Michel Henri Gustave Ghislain Caignet, Couvin, Belgium, assignor to Les Fonderies de L'eau Noire Societe Anonyme, Couvin, Belgium
Filed Jan. 2, 1968, Ser. No. 695,174
Claims priority, application Belgium, Jan. 4, 1967, 692,198, 692,199
Int. Cl. F24c 5/08, 3/04; F23d 13/14
U.S. Cl. 126—95                 11 Claims

ABSTRACT OF THE DISCLOSURE

A radiant heating apparatus for burning a liquid fuel with natural draft, the burner comprising an oblong gasification chamber having a vertically disposed radiating assembly which includes a series of elements each formed of two vertically disposed small metal vanes which are so inclined to one another as to meet at an acute angle on one side of a refractory support, and with the outwardly spaced edges being interconnected by a narrowed portion formed with horizontal slots.

My present invention relates to a radiant heating apparatus having a liquid fuel burner and a natural draught, the burner being formed by an oblong gasification chamber consisting of a base and two rectilinear flat walls connected at the ends by two semicylinders, with a radiating assembly disposed vertically, comprising a support lined with refractory material and conduits or flues juxtaposed in the ascending current of combustion gas.

It is an object of the invention to provide a radiating assembly which allows the development in a natural draught in an apparatus of the kind specified of a curtain of blue flames, ensuring in the form of a vertical sheet an effective contact with radiating elements, the assembly being more particularly suitable for the heating of dwelling premises.

More particularly, it is an object of the invention to produce an elongated fuel oil vaporising burner with a natural draught, operating with so-called "hydroxylated" combustion by the progressive oxidation of the combustible vapours, the burner being associated with an incandescent medium within which the combustion reactions take place, assisted by the catalytic effect of the presence of metal oxides by a known phenomenon, another object of the invention being to increase the radiation component of the resulting burner so as to improve the heating power at floor level.

The apparatus is mainly characterised in that the radiant element comprises a series of elements each formed by two small metal vanes disposed vertically and so inclined in relation to one another as to meet one another at an acute angle on the side of the refractory support, to ensure contact with the refractory material, while the spaced-out edges are interconnected by a narrowed portion formed with horizontal slots which ensure the radiant forward diffusion of the heat accumulated by the small vanes so inclined that the remaining strips form a partial screen allowing an elevated temperature to be maintained in the flues in which the combustion reactions take place.

In these conditions the incandescent medium spreads over the front wall of the heating chamber and comprises a row of metal flues juxtaposed substantially in the form of organ pipes and topping the rising curtain of gas in course of combustion.

Figure 2:
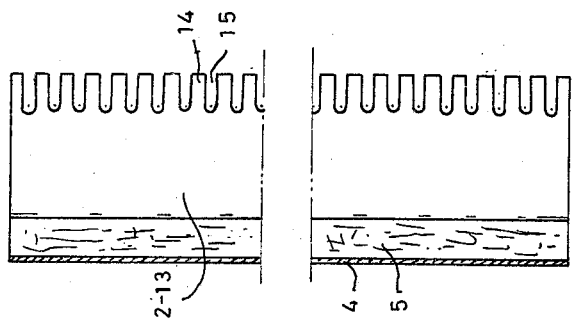
Figure 4:
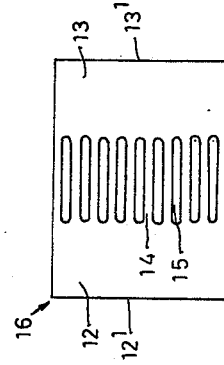
Figure 1:
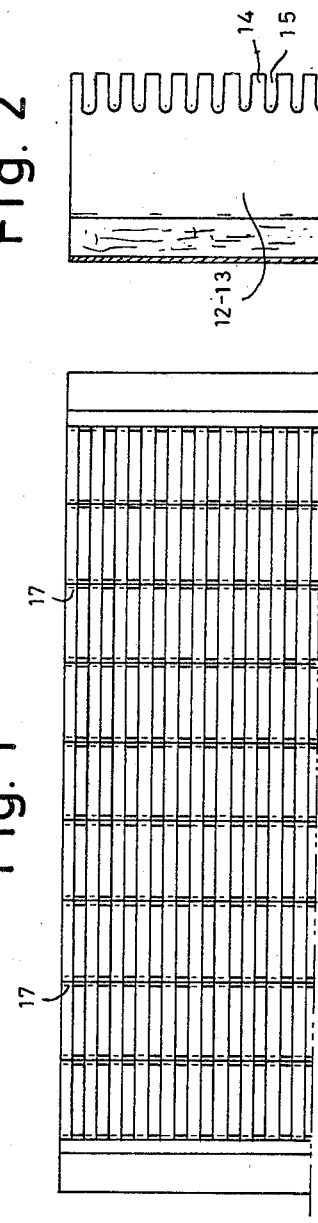
Figure 3:
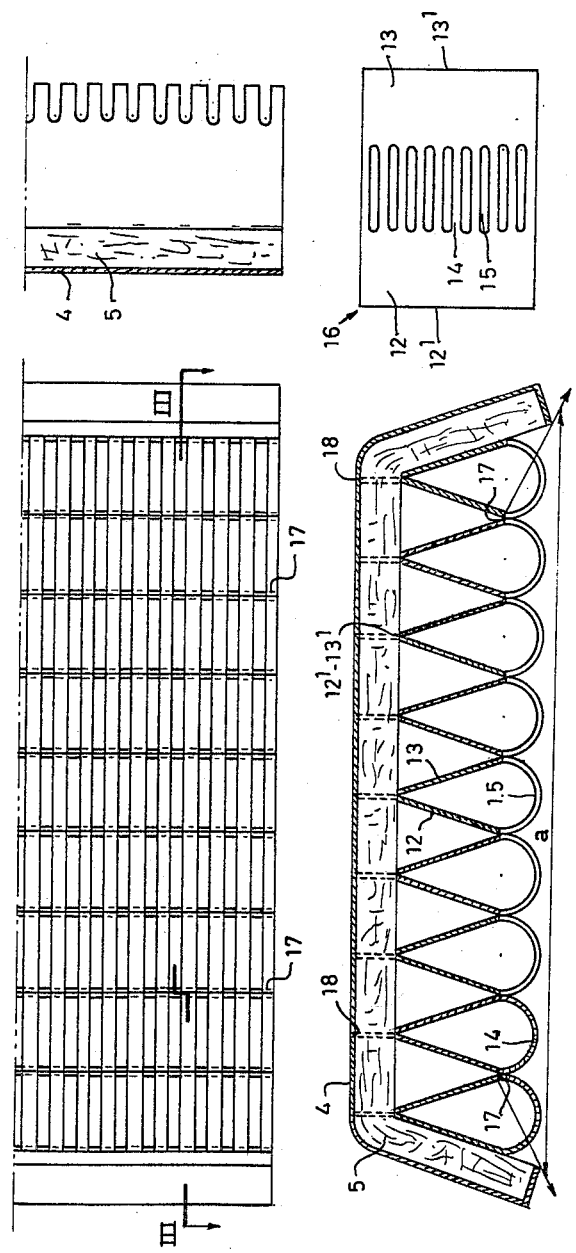
Figure 5:
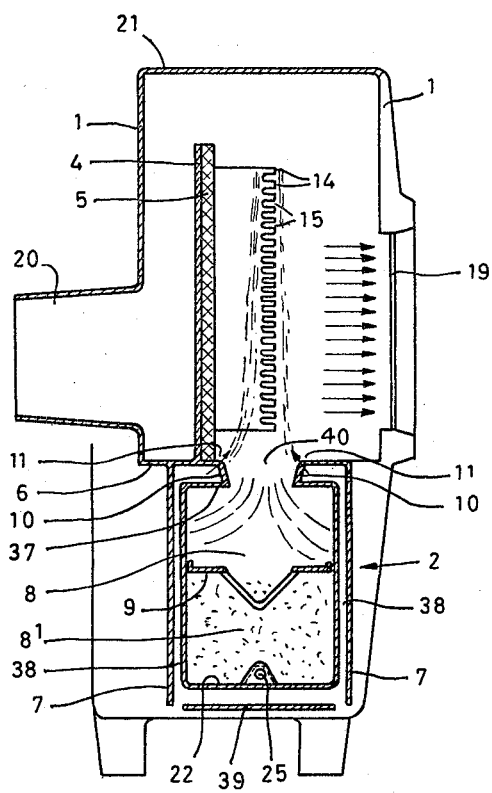

For the better understanding of the invention, a non-limitative embodiment thereof will now be described with reference to the drawings wherein:

FIG. 1 is a front elevation of the radiating assembly;
FIG. 2 is a vertical section through the assembly shown in FIG. 1;
FIG. 3 is a section, taken along the line III—III in FIG. 1;
FIG. 4 is a detail of a small vane in flattened development;
FIG. 5 is a view showing in vertical section the assembly of a heating apparatus according to the invention with a liquid fuel burner;
FIG. 6 is a vertically sectioned end view of the burner;
FIG. 7 is a view, sectioned along the line VII—VII in FIG. 6;
FIG. 8 is a view, sectioned along the line VIII—VIII in FIG. 6;
FIG. 9 is a plan view of the burner;
FIG. 10 is a view, horizontally sectioned along the line X—X in FIG. 1, and
FIGS. 11 and 12 are details of the apparatus.

The drawings show the envelope 1 (FIG. 5) of a heating apparatus comprising at the bottom a fuel oil burner 2 shown diagrammatically in FIG. 5.

The fuel oil burner comprises an oblong metal gasification chamber 3 (FIG. 6) formed by two flat surfaces $3^1$ (FIG. 10) connected at each end by a semicylindrical portion $3^2$.

Disposed in the upper portion of the fuel oil burner 2 is a radiating assembly shown in FIGURES 1–4 and comprising a support 4 lined with refractory material 5, disposed vertically and resting on a horizontal strip 6 unitary with an external envelope 7 extending around the gasification chamber 3 divided in height into two substantially equal spaces 8–$8^1$ by a gas distributor 9.

The burner head comprises surfaces 10 so inclined that at that place the outlet of the gases progressively increases in the upward direction; the curved intersection of the inclined surface 10 with the horizontal strip 6 comprises apertures 11 for supplying final air for combustion.

The radiating assembly also comprises a series of elements each formed by two small vanes 12–13 disposed vertically and so inclined in relation to one another as to meet at an acute angle on the side of the support 4–5, to ensure intimate contact with the refractory material, while the spaced-out edges are interconnected via a curved portion 14 formed with horizontal slots 15.

Each element can be formed by a single piece of sheet metal 16 (FIG. 4), the centre of which is formed with apertures or slots 15; the piece of sheet metal is bent in its centre, so that edges $12^1$–$13^1$ of the solid portions can meet to form the inclined small vanes 12, 13.

The elements 12–14 join at a place 17 over the whole height in the front portion, and are made unitary at a place 18 by attachment to the support 4.

Clearly, the combustion gases rise between the small vanes and are channeled in the flues formed by the spaces between the refractory material 5 and the small vanes 12, 13 and also in the spaces formed by the small vanes 12, 13 and the strips 14 intermingling with a curtain of flames by reason of the na'ural draft which is produced. The refractory material on which the small vanes rest has a lower heat conductivity than that of the material of which the small vanes are made, so that the latter rapidly absorb the accumulated heat, become red hot and are enclosed in a very hot atmosphere and disperse a visible radiation, while ensuring technically satisfactory combustion.

Since the radiating assembly is disposed vertically, there is formed above the burner a radiation wall comprising juxtaposed flues which are resistant to elevated temperatures and whose function is to produce surroundings or an atmosphere of elevated temperature inside which the combustion reactions are performed completely and rapidly as a result of the catalytic effect of the metal oxides with which the flames are in contact.

Moreover, the horizontal slots 15 ensure the forward radiant diffusion of the heat accumulated by the inclined small vanes 12, 13, so that as a result of the remaining strips 14 a partial screen is created, enabling an elevated temperature to be maintained inside the flues.

The radiation component of the heater is therefore appreciably increased and the heating power is improved at ground level.

Especially advantageous results are obtained when the radiating element described is disposed above a liquid fuel burner constructed in the manner shown in FIGURES 6–12.

A burner of the kind specified has a head comprising a surface 10 (FIGURE 5) which is so inclined that at that place the outlet of the gases progressively increases in the upward direction and is connected at the top to the horizontal strip 6 via a rounded portion formed with apertures 11 for supplying final air of combustion, the apertures 11 in the rectilinear portions having an angle of inclination $b$ smaller (see FIG. 12) than the angle of inclination $c$ of the apertures $11^1$ in the portions forming arcs of a circle (FIG. 9) thus reliably producing combustion in a homogeneous vertical sheet due to the fact that the flames are suitably directed vertically over the whole burner length.

The result is an apparatus formed by the combination of the following factors:

(1) The initial distribution of the fuel oil vapours by the use of a deflector or distributor adapted to spread the combustible gases over the whole length of the elongated burner.

(2) The selected orientation of the apertures for the introduction of secondary air, so as to give the ascending gases the form of a homogeneous curtain matching the shape of the device inside which the combustion reactions take place.

(3) The special shape of the refractory metal flues forming this device. The front surface of the flues of tubular section is formed with horizontal slots adapted to screen the radiation emission of the surroundings in which the combustion reactions take place. This control of the radiation emission maintains the temperature considered necessary for the complete and rapid development of the reactions between the combustion-encouraging air and the combustible gases which are drawn out in layers in the metal flues.

The red hot radiating elements radiate through a screen 19 of refractory glass.

The generally circular arrangement of the small vanes produces an angle of radiation $a$ (FIGURE 3) which is considerable in both the horizontal and vertical directions.

After leaving the spaces between the small vanes of the radiating assembly, the flow of gas is deflected by the support, 4, which forms a baffle, and is entrained by suction to the flue or chimney 20.

Before being evacuated, the burnt gases can come into contact with a heating surface (not shown) having small vanes disposed horizontally along the upper plate 21 to form a detachable heating plate.

The surface 22 forming the bottom of the gasification chamber acts as an evaporation surface and is formed, along the longitudinal axis of the vessel, with lugs 23 and 24, one of which receives the pipe 25 which supplies fuel oil or some other liquid fuel and terminates in an aperture 26 with which an inclined wall 27 is formed.

The gasification chamber 3 is formed with air-inlet apertures disposed, in the embodiment illustrated, in six superimposed rows 28–33.

Alternate ones of apertures 28 of the lower row are directed toward the evaporation surface 22.

The apertures in the rows 29, 30, 31 and 32 are provided in a number equal to half the number of the apertures in the rows 28 and 33, although these apertures are always in vertical alignment and in quincunx in relation to one another. The rows 28 and 33 have the same number of apertures.

Disposed substantially halfway up the internal periphery of the gasification chamber are brackets 34 supporting the gas distributor 9 formed by a strip, generally of refractory metal, extending along the internal perihery of the gasification chamber and dividing the chamber in the direction of its height into two substantially equal spaces.

The gas distributor 9 is as a rule formed by two elements juxtaposed by their rectilinear portions whose parallel edges are interconnected in each element at the end via a V-shaped portion 35 whose apex 36 is directed downwards.

The metal burner head also has the same shape as the gasification chamber and comprises a strip 37 which is slightly inclined upwards from the external edge and which is connected to the upper portion of the gasification chamber and to which the inclined surface 10 is so connected that the outlet of the gases progressively increases upwards, the surface 10 being connected at its top via the horizontal strip 6 to the external envelope 7 extending around the gasification chamber at a certain distance therefrom, so as to form a downwardly open space 38 via which air is supplied.

The apparatus is completed by a rectangular screen bottom 39 which is rounded at the corners, in accordance with the shape of the envelope 7, and leaves two parallel rectilinear air-admitting passages, and two passages in the form of arcs of a circle.

In the apparatus described, the rather voluminous gasification chamber is divided in height into two substantially equal portions by the horizontal gas distributor 9.

The lower portion of the chamber forms an assembly meeting the requirements of the complete burner adapted to operate suitably at reduced output.

The combustible vapours being formed on the gasification surface 22 are seized and slightly oxidised by the air supplied via the alternate apertures in the row 28 which are inclined downwards.

The vapours are subjected to a second oxidation when they pass through the plane swept by the air coming from the other half of the apertures in the row 28.

Oxidation continues at the level of the row 29 and if the amount of combustible vapours is small (reduced conditions), the oxidation produced by the apertures in the rows 30 and 31 is adequate to obtain complete combustion.

When there is a considerable formation of combustible vapours (medium or maximum output), the effect of the combustible vapours passing through the two apertures formed at the place 29 in the distributor is to concentrate these vapours in two substantially equal pre-oxidised volumes appearing symmetrically in the direction of the length of the burner.

The rows of apertures 32 and 33 complete the oxidation, whereafter the mixture passes through a constriction 40 formed by the burner head.

The mixture, concentrated by the layering effect caused by crossing the constriction, is fed during its ascent by the final air of combustion supplied via the rows of apertures $11–11^1$.

Due to the orientation of the apertures $11–11^1$ for introducing secondary air, any obstruction is prevented during the escape of the combustible vapours.

What I claim is:

1. A radiant heating apparatus combined with a liquid fuel burner with natural draught, the burner comprising an oblong gasification chamber consisting of a base and two rectilinear flat walls connected at the ends by two semi-cylinders, a radiating assembly disposed vertically having a support lined with refractory material and flues juxtaposed in the ascending current of combustion gases from the burner, the radiating assembly comprising a series of elements each being formed by two small metal vanes disposed vertically, forming the ascending flues and being so inclined in relation to one another as to meet one another at an acute angle on the side of the refractory support to ensure contact with the refractory material while the spaced out edges of the vanes are interconnected by a bent narrowed portion comprising horizontal slots ensuring the radial forward diffusion of the heat accumulated by the said vanes, the remaining strips between the slots forming a screen allowing an elevated temperature to be maintained in the combustion flues.

2. A radiant heating apparatus as set forth in claim 1 in which the refractory support has lower conductivity than the small vanes, whereby the vanes rapidly absorb the accumulated heat and are brought to red heat while being enclosed in a very hot surrounding atmosphere and disperse visible radiation while ensuring complete combustion.

3. A radiant heating apparatus as set forth in claim 2 in which each element of the radiating assembly is formed from a single piece of sheet-metal whose central portion is formed with slots and the piece of sheet-metal is bent in this central portion in such a manner the solid portions meet one another to form the inclined small vanes.

4. A radiant heating apparatus as set forth in claim 1 wherein said liquid fuel burner has a head comprising a surface which is so inclined that at that place the outlet of the gases progressively increases in the upward direction and is connected at the top to a horizontal strip via a portion formed with apertures for the supply of the final air for combustion, the apertures in the rectilinear parts of said apertured portion having an angle of inclination less than the angle of inclination of the apertures in the parts of said apertured portion forming arcs of a circle, thereby producing combustion in a homogeneous vertical sheet.

5. A radiant heating apparatus as set forth in claim 4 characterized in that said burner is of the same general shape as said gasification chamber and said apertured portion is rounded.

6. A radiant heating apparatus as set forth in claim 5 characterized in that said horizontal strip is connected to an external envelope enclosing the gasification chamber at a predetermined distance therefrom, so as to form a downwardly open air-supplying space.

7. A radiant heating apparatus as set forth in claim 5 characterized in that the gasification chamber is divided in height into two substantially equal portions by a gas distributor, the lower portion of said chamber forming an assembly adapted to function as a complete burner at reduced output and having formed therein a multiplicity of apertures in successive parallel horizontal rows, the apertures of the lowermost row of holes having alternate ones thereof directed towards an evaporation surface forming the bottom of the gasification chamber, the combustible vapors being formed on that surface being seized and slightly oxidized by the air supplied by these apertures in said bottom row which are downwardly inclined, whereafter the vapors are given a second oxidation when they pass through the plane swept by the air coming from the other half of the apertures in said bottom row, whereby oxidation continuing at the level of the next higher row of apertures and during slowed-down operation the oxidation produced by said next higher row of apertures being adequate to produce complete combustion.

8. A radiant heating apparatus as set forth in claim 5 which further includes a gas distributing element which is formed by a strip extending along the internal periphery of the gasification chamber, said distributing element comprising two portions which are juxtaposed by their rectilinear portions whose parallel edges are interconnected in each element at the end by a V-shaped portion whose apex is downwardly directed, said distributing element being formed with two apertures on either side of the V-shaped portions.

9. A heating apparatus as set forth in claim 1 characterized in that the radiating assembly forms a row of metal flues which are juxtaposed substantially in the form of organ pipes and top a rising homogeneous curtain of gas in course of combustion distributed over the whole length of the burner.

10. A radiant heating apparatus combined with a liquid fuel burner with natural draught, the burner comprising an oblong gasification chamber consisting of a base and two rectilinear flat walls connected at the ends by two semi-cylinders, a radiating assembly disposed vertically and having a support lined with refractory material and flues juxtaposed in the ascending current of combustion gases from the burner, the radiating assembly comprising a series of elements each being formed by two small metal vanes disposed vertically which form the ascending flues and are so inclined in relation to one another as to meet one another at an acute angle on the side of the refractory support to ensure contact with the refractory material while the spaced-out edges of the vanes are interconnected by a bent rounded portion comprising horizontal slots ensuring the radial forward diffusion of the heat accumulated by the said vanes, the remaining strips between the slots forming a screen allowing an elevated temperature to be maintained in the combustion flues, the burner having a head of the same general shape as the gasification chamber and comprising a surface so inclined that at that place the outlet of the gases progressively increases in the upward direction, said inclined surface being connected at the top to a horizontal strip via an apertured portion for supplying final combustion air, the apertures in the rectilinear parts of said apertured portion having an angle of inclination less than the angle of inclination of the apertures in the terminal parts of said apertured portion in the shape of arcs of a circle so as to distribute the combustion gases in the vertical flues in the form of a rising curtain of gases over the whole length of the elongated burner.

11. A liquid fuel burner with natural draft heating apparatus comprising in combination:
  an oblong gasification chamber including a base and two rectilinear flat walls connected at the ends by two semi-cylinders,
  a head of the same shape as the gasification chamber comprising generally opposed surfaces (10) which are divergingly inclined in the direction of gas flow,
  each said inclined surface being connected at the discharge end to a strip (6) positioned generally normal to the direction of gas flow via a portion formed with apertures for the supply of the final air for combustion,
  said apertures in the rectilinear parts of said apertured portion having an angle of inclination less than the angle of inclination of the apertures in the parts of said apertured portion forming arcs of a circle thereby producing combustion in a homogeneous vertical sheet at the outlet of the burner.

References Cited

UNITED STATES PATENTS 2,072,048   2/1937   Leonard   126—95

CHARLES J. MYHRE, Primary Examiner

U.S. Cl. X.R.

126—92; 431—347